United States Patent
Kim et al.

(10) Patent No.: US 10,456,707 B2
(45) Date of Patent: Oct. 29, 2019

(54) REACTOR

(71) Applicant: LG CHEM, LTD., Seoul (KR)

(72) Inventors: Dae Hun Kim, Daejeon (KR); Jun Won Choi, Daejeon (KR); Seung Hyun Yoon, Daejeon (KR); Ye Hoon Im, Daejeon (KR); Chang Hoon Kang, Daejeon (KR); Myeong Yeon Keum, Daejeon (KR); Seong Gu Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/762,468

(22) PCT Filed: Nov. 16, 2016

(86) PCT No.: PCT/KR2016/013208
§ 371 (c)(1),
(2) Date: Mar. 22, 2018

(87) PCT Pub. No.: WO2017/095045
PCT Pub. Date: Jun. 8, 2017

(65) Prior Publication Data
US 2018/0272249 A1    Sep. 27, 2018

(30) Foreign Application Priority Data
Nov. 30, 2015    (KR) .................. 10-2015-0169417

(51) Int. Cl.
| | | |
|---|---|---|
| *A61L 2/00* | (2006.01) | |
| *B01D 47/02* | (2006.01) | |
| *B01D 47/06* | (2006.01) | |
| *B01D 9/00* | (2006.01) | |
| *B01J 4/00* | (2006.01) | |

(52) U.S. Cl.
CPC ............ *B01D 9/0059* (2013.01); *B01J 4/002* (2013.01); *B01D 2009/0086* (2013.01)

(58) Field of Classification Search
CPC ..... A61L 9/00; A61L 9/02; A61L 9/03; A61L 9/04; A61L 9/14
USPC ..... 422/292, 300, 305–307; 96/243; 261/76, 261/78.1
See application file for complete search history.

(56) References Cited

FOREIGN PATENT DOCUMENTS

| | | | | |
|---|---|---|---|---|
| JP | 2007038165 A | | 2/2007 | |
| JP | 2015104683 A | | 6/2015 | |
| KR | 10-2012-0119741 | * | 10/2012 | ............ C07C 37/20 |
| KR | 1020120119741 A | | 10/2012 | |
| KR | 1020130103816 A | | 9/2013 | |
| KR | 1020150086740 A | | 7/2015 | |
| WO | 2011/162952 A1 | | 12/2011 | |

OTHER PUBLICATIONS

Korean Patent Office English Machine Translation of KR 10-2012-0119741 A.*

* cited by examiner

*Primary Examiner* — Monzer R Chorbaji
(74) *Attorney, Agent, or Firm* — Dentons US LLP

(57) ABSTRACT

The present invention relates to a reactor, and according to one aspect of the present invention, there is provided a reactor comprising a housing provided with a reaction space, a tube disposed inside the housing, an impeller provided inside the housing to allow reactants in the reaction space to flow into and out of the tube and a nozzle provided to spray a liquid from the reaction space toward the housing wall surface side.

8 Claims, 5 Drawing Sheets

[Figure 1]
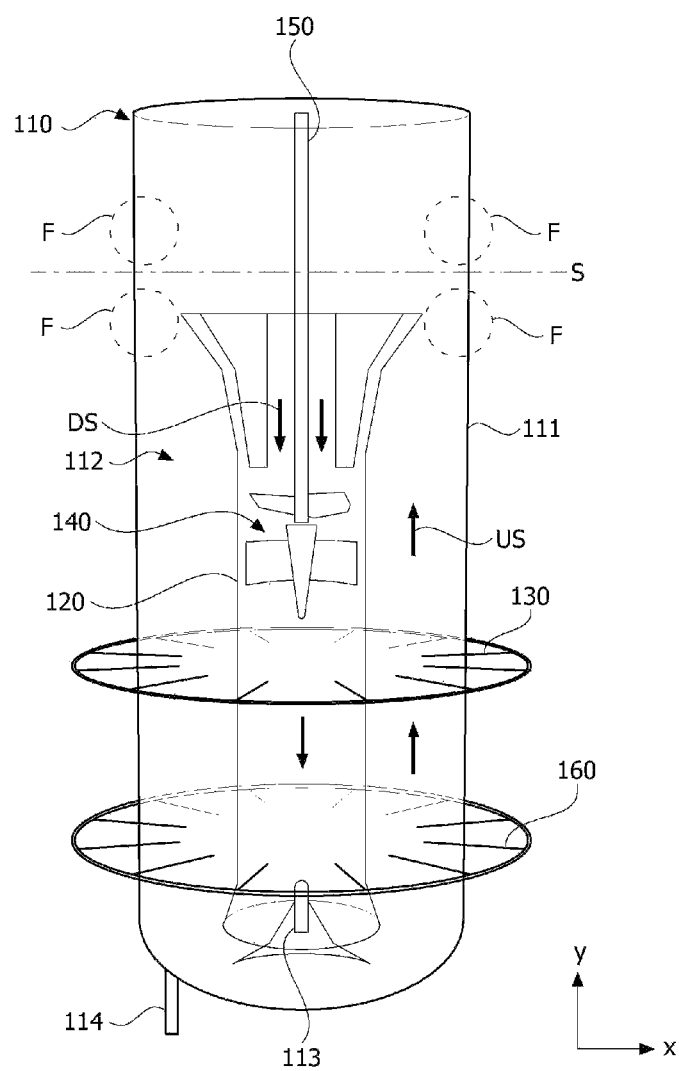

[Figure 2]
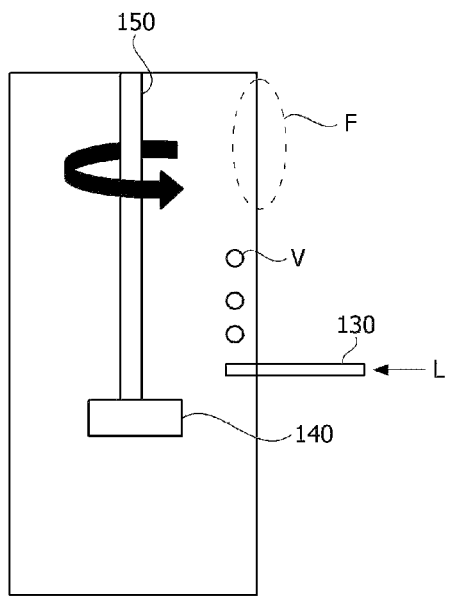
[Figure 3]
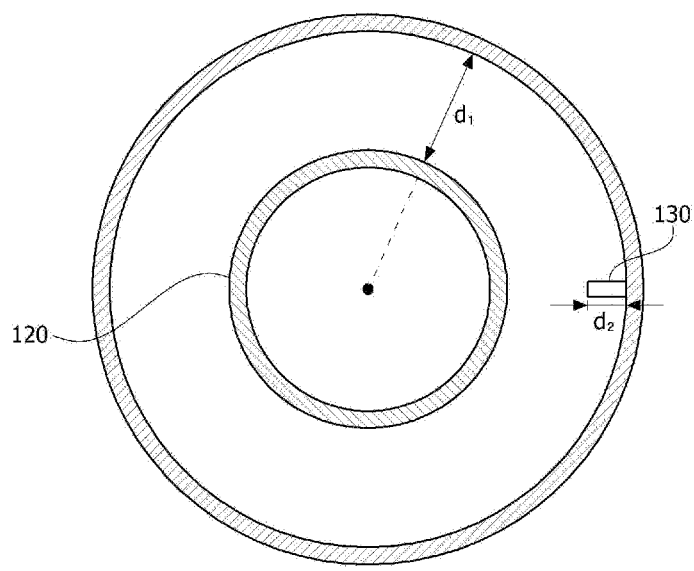

[Figure 4]
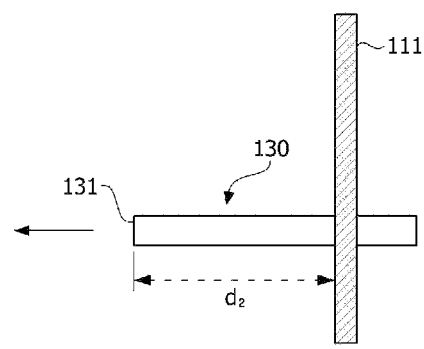
[Figure 5]
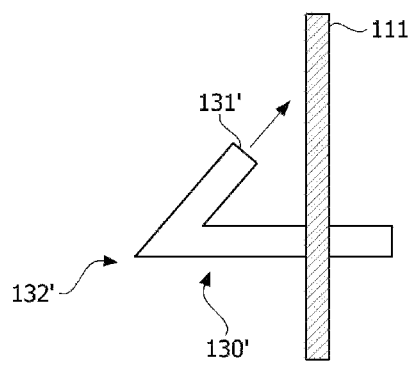

[Figure 6]
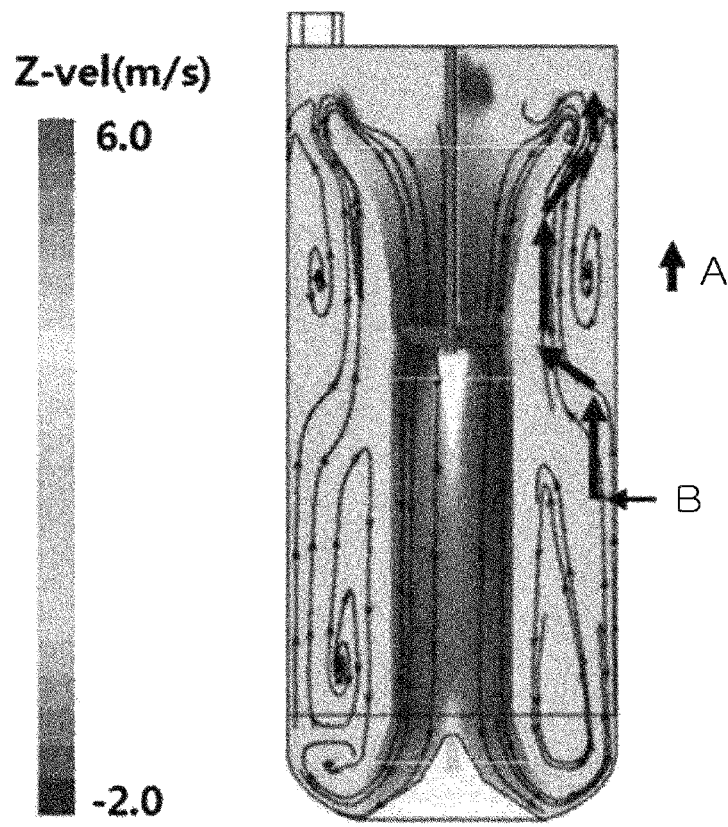

[Figure 7]
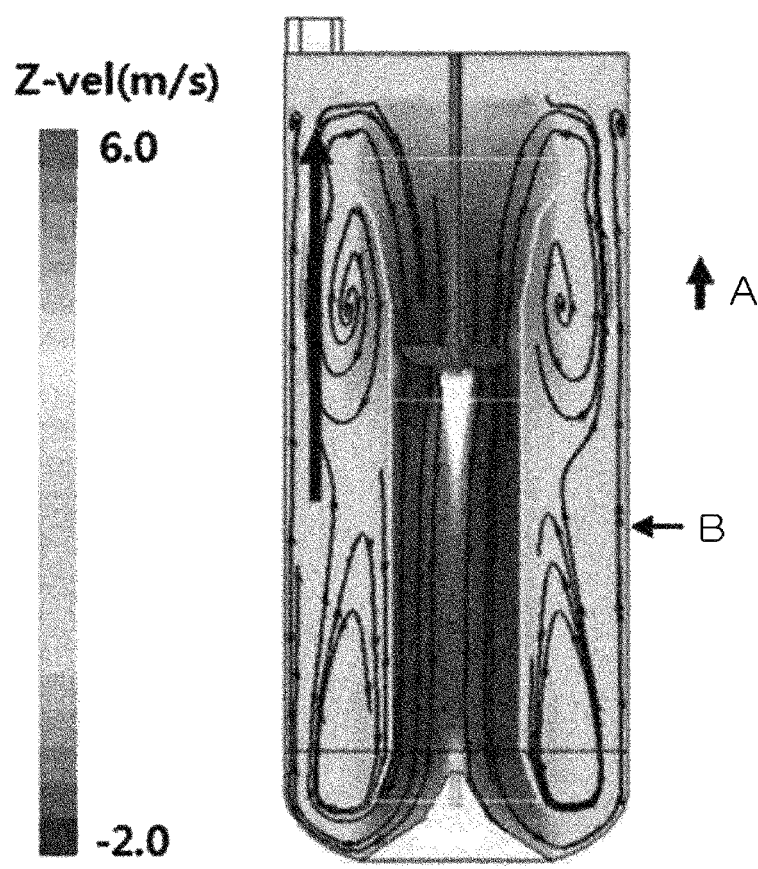

REACTOR

TECHNICAL FIELD

The present invention relates to a reactor, and more particularly to a crystallizer in which a crystallization reaction takes place.

This application is a National Stage Application of International Application No. PCT/KR2016/013208, filed Nov. 16, 2016, and claims the benefit of Korean Patent Application No. 10-2015-0169417, filed Nov. 30, 2015, the contents of which are incorporated herein by reference in their entirety for all purposes as if fully set forth below.

BACKGROUND ART

Crystallization, which is a field of separation technology, may easily isolate the desired specific substance through crystals. Therefore, in the industrial field, various products are produced by using crystallization methods.

In general, generation of fouling is a very serious problem in the crystallization process. The fouling occurs mainly on the inner wall of the crystallizer where the liquid surface is in contact, and the generated fouling gradually increases over time. Then, fouling agglomerates having a large size are separated from the inner wall of the crystallizer, moved inside the crystallizer, and result in instability of the process.

In addition, periodic cleanings are required to remove the generated fouling, for which the shorter production days cause a reduction in the amount of production.

Therefore, to raise the stability of the process and increase the production amount of products, it is important to prevent generation of fouling on the crystallizer wall surface.

DISCLOSURE

Technical Problem

It is a problem to be solved by the present invention to provide a reactor capable of inhibiting generation of fouling during a crystallization reaction.

Technical Solution

To solve the above-described problem, according to one aspect of the present invention, there is provided a reactor comprising a housing provided with a reaction space, a tube disposed inside the housing, an impeller provided inside the housing to allow reactants in the reaction space to flow into and out of the tube and a nozzle provided to spray a liquid from the reaction space toward the housing wall surface side.

At this time, it is preferred that the nozzle is provided such that a jetting port is located at 5% or less of the distance between the wall surface of the housing and the tube.

In addition, the nozzle may be provided to spray the liquid toward the housing wall surface side after being extended from the wall surface of the housing toward the tube side.

Furthermore, the nozzle may be provided to have a bent part. For example, the nozzle may be extended to have a predetermined first length from the housing wall surface toward the tube side, and then bent toward the housing wall surface side, and extended to have a second length toward the housing wall surface side. For example, it is preferred that the second length is shorter than the first length.

Also, the length (first length) of the nozzle may be 5% or less of the distance between the wall surface of the housing and the tube.

In addition, it may be provided such that in the reaction space, a crystallization reaction takes place, and the nozzle sprays a liquid for eliminating crystallization heat. That is, the nozzle is connected to a supply source for supplying the liquid.

Furthermore, the nozzle may be provided so that vapor generated by vaporization of the liquid sprayed from the nozzle during the crystallization reaction rises adjacent to the wall surface of the housing.

Also, the tube may have a hollow opening along the height direction of the housing. In addition, the tube may be provided such that the diameter increases or decreases at any one of the upper end and the lower end.

In addition, the impeller may be disposed inside the tube.

According to another aspect of the present invention, there is provided a reactor comprising a housing provided with a reaction space, a tube disposed inside the housing, an impeller provided inside the housing to allow reactants in the reaction space to flow into and out of the tube and a nozzle extended to a predetermined length (first length) from the housing wall surface toward the tube side to spray the liquid into the reaction space, wherein the length of the nozzle (first length) is 5% or less of the distance between the housing wall surface and the tube.

In addition, it may be provided such that in the reaction space, a crystallization reaction takes place, and the nozzle sprays a liquid for eliminating crystallization heat.

Furthermore, it is preferred that the nozzle is provided so that vapor generated by vaporization of the liquid sprayed from the nozzle during the crystallization reaction rises adjacent to the wall surface of the housing.

Also, the nozzle may be provided to spray a liquid toward the tube side.

In addition, the tube may have a hollow opening along the height direction of the housing.

Furthermore, the impeller may be disposed inside the tube.

Also, the tube may be provided such that the diameter increases or decreases at any one of the upper end and the lower end.

According to another aspect of the present invention, there is provided a reactor comprising a housing provided with a reaction space, a tube disposed inside the housing, an impeller provided inside the housing to allow reactants in the reaction space to flow into and out of the tube and a nozzle extended from the housing wall surface toward the tube side to spray a predetermined liquid into the reaction space, wherein the nozzle is provided to spray a liquid toward the housing wall surface side.

It is also preferred that the nozzle is provided such that the jetting port is located at 5% or less of the distance between the housing wall surface and the tube.

In addition, the nozzle may be provided to have a bent part.

Furthermore, it is provided such that in the reaction space, a crystallization reaction takes place, and the nozzle sprays a liquid for eliminating crystallization heat.

Also, it is preferred that the nozzle is provided such that vapor generated by vaporization of the liquid sprayed from the nozzle during the crystallization reaction rises adjacent to the wall surface of the housing.

In addition, the tube may be a draft tube.

Furthermore, the tube may have a hollow opening along the height direction of the housing.

Also, the impeller may be disposed inside the tube.

Advantageous Effects

As described above, the reactor associated with at least one example of the present invention has the following effects.

Generally, vaporization heat (endothermic reaction) of a liquid material is used to remove crystallization heat occurring inside the crystallizer. At this time, if the liquid injected for vaporization is phase-changed to vapor, buoyancy due to the density difference occurs, whereby the vapor rises to the crystallizer liquid surface and is discharged to the upper part.

As in the present invention, when the jetting port of the nozzle is installed to be located close to the crystallizer wall surface, the vapor rises near the crystallizer wall surface, where the fouling generated at the crystallizer wall surface is inhibited by shear force of the generated vapor.

BRIEF DESCRIPTION OF DRAWINGS

FIG. 1 is a schematic view of a reactor associated with a first example of the present invention.

FIG. 2 is a conceptual diagram for explaining one operating state of a nozzle for inhibiting generation of fouling.

FIG. 3 is a cross-sectional view of the reactor shown in FIG. 1.

FIG. 4 is an enlarged cross-sectional view of the nozzle shown in FIG. 1.

FIG. 5 is a cross-sectional view of a nozzle constituting the reactor related to a second example of the present invention.

FIGS. 6 and 7 are simulation results for comparing internal flows in a conventional reactor and a reactor according to the present invention.

MODE FOR INVENTION

Hereinafter, a reactor (or referred to as a crystallizer) according to one example of the present invention will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

FIG. 1 is a schematic view of a reactor related to the first example of the present invention, FIG. 2 is a conceptual view for explaining one operating state of a nozzle for inhibiting generation of fouling, FIG. 3 is a cross-sectional view of the reactor shown in FIG. 1, and FIG. 4 is an enlarged cross-sectional view of the nozzle shown in FIG. 1.

The reactor (100) related to the first example comprises a housing (110) provided with a reaction space (112). In addition, the housing (110) comprises a supply part (113) through which a reactant is supplied and a discharge part (114) through which a product is discharged to the outside. In one example, the supply part (113) may be provided in the lower part of the inside of the tube (120), and the discharge part (114) may be provided in the lower end area of the housing (110). An unexplained reference numeral 111 denotes a wall surface of the housing (110).

Also, the reactor (100) comprises a tube (120) disposed inside the housing (110). The tube (120) has a hollow opening along the height direction (y-axis direction) of the housing. As the tube (120), a draft tube is used to enhance the up-and-down flow inside the reactor (100).

In addition, the reactor (100) comprises an impeller (140) provided inside the housing (110) to allow reactants in the reaction space (112) to flow into and out of the tube (120). By the impeller (140), the reactants circulate inside and outside the tube (120). As the impeller (140), various well-known impellers used in the crystallizer may be employed. Furthermore, a driving shaft (150) for rotating the impeller (140) is provided and the driving shaft (150) is connected to a driving part (not shown) such as a motor. For example, by rotation of the impeller (140), a downward stream (DS) of the reactant may be formed inside the tube (120) and an upward stream (US) of the reactant may be formed in the space between the tube (120) and the wall surface (111) of the housing (110). Meanwhile, all the centers of the driving shaft (150), the tube (120) and the housing (110) may be each coaxially arranged. In addition, the impeller (140) may be disposed inside the tube (120). Also, the tube (120) may be provided such that the diameter increases or decreases at any one of the upper end and the lower end.

Also, the reactor (100) comprises a nozzle (130) extended to a predetermined length (d2) (first length) from the wall surface (111) of the housing (110) toward the tube (120) side so as to spray a liquid (L) into the reaction space (112). A plurality of nozzles (130) may be provided along the circumferential direction of the tube (120). The liquid should be a liquid having a boiling point that vaporization can occur at the pressure and temperature inside the reactor, and for example, pentane in the BPA process may be used as the liquid.

Here, the length (d2) of the nozzle (130) is 5% or less of the distance (d1) between the wall surface (111) of the housing (110) and the tube (120). The length of the nozzle (130) herein means the length of the portion located inside the housing (110). Specifically, the length of the nozzle (130) may mean the distance from the wall surface (111) of the housing (110) to the jetting port (131) of the nozzle (130). In addition, the distance (d1) between the wall surface (111) of the housing (110) and the tube (120) means the distance along the radial direction (x-axis direction) of the tube (120).

As described above, it is provided such that in the reaction space (112), a crystallization reaction takes place, and the nozzle (130) sprays a liquid (L) for eliminating crystallization heat.

In addition, referring to FIGS. 1 and 2, it is preferred that the nozzle (130) is provided such that vapor (v) generated by vaporization of the liquid sprayed from the jetting port (131) of the nozzle (130) during the crystallization reaction rises adjacent to the wall surface (111) of the housing (110).

As described above, the vaporization heat (endothermic reaction) of the liquid (L) sprayed from the nozzle (130) is used to remove the crystallization heat occurring inside the crystallizer. At this time, if the liquid (L) injected for vaporization is phase-changed to vapor (v), buoyancy due to the density difference is generated, whereby the vapor (v) rises to the crystallizer liquid surface (S) and is discharged to the upper part.

As in the present application, when the jetting port (131) of the nozzle (130) is installed to be located close to the crystallizer wall surface (111), the vapor (v) rises near the crystallizer wall surface (111), where the fouling (F) generated at the crystallizer wall surface is inhibited by shear force of the generated vapor (v).

On the other hand, if the length (d2) of the nozzle (130) becomes longer than 5% of the distance (d1) between the wall surface (111) of the housing (110) and the tube (120), the vaporized vapor rises while being separated from the wall surface (111), and thus there is a problem that it is difficult to apply shear force to the fouling (F) of the wall surface (111).

Meanwhile, the nozzle (130) may be provided to spray the liquid (L) toward the tube (120) side. That is, the jetting port (131) of the nozzle (130) may be disposed toward the tube (121).

On the other hand, an unexplained reference numeral 160 performs a uniform flow rate distribution function of the nozzle (130) for spraying the liquid into the reactor.

FIG. 5 is a cross-sectional view of a nozzle constituting the reactor related to the second example of the present invention. The reactor associated with the second example differs from the reactor (100) associated with the first example only in the shape of the nozzle. Therefore, the remaining components except for the nozzle (130') are the same as those of the reactor (100) explained via FIG. 1, and the remaining components will be described by quoting FIG. 1.

Referring to FIGS. 1 and 5, the reactor (100) of the second example comprise a housing (110) provided with a reaction space (112), a tube (120) disposed inside the housing (110), an impeller (140) provided inside the housing to allow reactants in the reaction space (112) to flow into and out of the tube and a nozzle (130') extended from the wall surface (111) of the housing (110) toward the tube (120) side to spray a predetermined liquid into the reaction space. At this time, the nozzle (130') is provided to spray the liquid (L) toward the wall surface (111) side of the housing (110). That is, the nozzle (130') is provided such that the jetting port (131') faces the wall surface (111) of the housing (110).

The reactor (100) comprises a nozzle provided to spray the liquid from the reaction space (112) toward the housing wall surface (111) side.

At this time, it is preferred that the nozzle (130') is provided so that the jetting port (131') is located at 5% or less of the distance between the housing wall surface (111) and the tube (120).

In addition, the nozzle may be provided to spray the liquid toward the housing wall surface side after being extended by the first length from the housing wall surface toward the tube side.

Referring to FIG. 5, the nozzle (130') may be provided to have a bent part (132'). For example, the nozzle (130') may be extended from the housing wall surface (111) toward the tube (120) side to have a predetermined first length, and then bent toward the housing wall surface (111) side, and extended to have a second length toward the housing wall surface (111) side. For example, it is preferred that the second length is shorter than the first length.

In addition, the length (first length) of the nozzle (130') may be 5% or less of the distance between the housing wall surface and the tube.

Furthermore, it may be provided such that in the reaction space (112), a crystallization reaction takes place, and the nozzle (130') sprays a liquid for eliminating crystallization heat. That is, the nozzle (130') is connected to a supply source for supplying the liquid.

FIGS. 6 and 7 are simulation results for comparing internal flows in a conventional reactor (10) and a reactor (100) according to the present invention.

Symbol A indicates the vapor movement direction, and Symbol B indicates the liquid injection position.

FIG. 6 shows the internal flow in the conventional reactor (10), and it can be confirmed that while the vapor (v) rises inside the crystallizer, the fouling of the housing wall surface is not removed.

FIG. 7 shows the internal flow in the reactor (100) related to the present invention, and it can be confirmed that by disposing the position of the jetting port in the nozzle close to the crystallizer wall surface, the vapor (v) rises near the crystallizer wall surface, where the fouling (F) generated at the crystallizer wall surface disappears by shear force of the generated vapor (v).

The preferred examples of the present invention as described above are disclosed for illustrative purposes, which can be modified, changed and added within thought and scope of the present invention by those skilled in the art and it will be considered that such modification, change and addition fall within the following claims.

INDUSTRIAL APPLICABILITY

As in the present invention, when the jetting port of the nozzle is installed to be located close to the crystallizer wall surface, the vapor rises near the crystallizer wall surface, where the fouling generated at the crystallizer wall surface can be inhibited by shear force of the generated vapor.

The invention claimed is:

1. A reactor comprising:
   a housing provided with a reaction space;
   a tube disposed inside said housing;
   an impeller provided inside the housing to allow reactants in the reaction space to flow into and out of the tube; and
   a nozzle provided to spray a liquid from the reaction space toward the housing wall surface side,
   wherein the nozzle is provided such that a jetting port is located at 5% or less of the distance between the housing wall surface and the tube, and
   wherein the nozzle is provided along the circumferential direction of the tube.

2. The reactor according to claim 1, wherein the nozzle is provided to spray the liquid toward the housing wall surface side after being extended from the housing wall surface toward the tube side.

3. The reactor according to claim 2, wherein the nozzle is provided to have a bent part.

4. The reactor according to claim 1, wherein the reactor is provided such that in the reaction space, a crystallization reaction takes place, and
   the nozzle sprays the liquid for eliminating crystallization heat.

5. The reactor according to claim 4, wherein the nozzle is provided so that vapor generated by vaporization of the liquid sprayed from the nozzle during the crystallization reaction rises adjacent to the wall surface of the housing.

6. The reactor according to claim 1, wherein the tube has a hollow opening along the height direction of the housing.

7. The reactor according to claim 6, wherein the impeller is disposed inside the tube.

8. The reactor according to claim 6, wherein the tube is provided such that the diameter increases or decreases at any one of the upper end and the lower end.

* * * * *